(12) United States Patent
Le Saux (10) Patent No.: US 11,300,815 B2
(45) Date of Patent: Apr. 12, 2022

(54) METHOD AND ASSEMBLY FOR VERIFYING THE MOUNTING OF AN OPHTHALMIC LENS IN A FRAME

(71) Applicant: Essilor International, Charenton le Pont (FR)

(72) Inventor: Gilles Le Saux, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 16/769,956

(22) PCT Filed: Dec. 6, 2018

(86) PCT No.: PCT/EP2018/083876
§ 371 (c)(1),
(2) Date: Jun. 4, 2020

(87) PCT Pub. No.: WO2019/110764
PCT Pub. Date: Jun. 13, 2019

(65) Prior Publication Data
US 2020/0387012 A1 Dec. 10, 2020

(30) Foreign Application Priority Data

Dec. 6, 2017 (EP) .................................. 17306715

(51) Int. Cl.
*G06T 17/20* (2006.01)
*G02C 13/00* (2006.01)
(Continued)

(52) U.S. Cl.
CPC ............. *G02C 13/005* (2013.01); *G06T 3/40* (2013.01); *G06T 7/0014* (2013.01); *G06T 7/337* (2017.01);
(Continued)

(58) Field of Classification Search
CPC .. G02B 27/0172; G02B 27/0075; G02B 1/10; G02C 13/005; G02C 7/102;
(Continued)

(56) References Cited

U.S. PATENT DOCUMENTS

| 9,086,582 B1 | 7/2015 | Barton | |
|---|---|---|---|
| 2012/0002168 A1* | 1/2012 | Bonnin | .............. G01M 11/0257 351/222 |
| 2015/0293382 A1 | 10/2015 | Jethmalani et al. | |

FOREIGN PATENT DOCUMENTS

| EP | 1038495 A2 | 9/2000 |
|---|---|---|
| FR | 2220803 A1 | 10/1974 |
| WO | 2008/009355 A1 | 1/2008 |

OTHER PUBLICATIONS

International Search Report, dated Dec. 6, 2018, from corresponding PCT application No. PCT/EP2018/083876.

* cited by examiner

*Primary Examiner* — Phuoc H Doan
(74) *Attorney, Agent, or Firm* — Nixon & Vanderhye (57) ABSTRACT

Disclosed is a method for verifying the mounting of at least one ophthalmic lens in a frame of a pair of spectacles designed to be worn by a subject, the method including the steps of: obtaining a test image of the frame in which the at least one ophthalmic lens is mounted, the at least one ophthalmic lens including at least one marking visible in the test image; comparing the test image of the frame with a reference image of the frame worn by the subject without the at least one ophthalmic lens; and verifying the mounting of the at least one ophthalmic lens in the frame based on the previous comparison.

20 Claims, 3 Drawing Sheets

(51) Int. Cl.
*G06T 7/73* (2017.01)
*G06T 7/33* (2017.01)
*G06T 3/40* (2006.01)
*G06T 7/00* (2017.01)

(52) U.S. Cl.
CPC ...... *G06T 7/74* (2017.01); *G06T 2207/20212* (2013.01); *G06T 2207/30041* (2013.01); *G06T 2207/30204* (2013.01)

(58) Field of Classification Search
CPC ..... G02C 2202/16; G02C 7/083; A61B 3/113; A61B 3/1015; C09D 175/04; C09D 7/61; C09D 5/00
See application file for complete search history.

METHOD AND ASSEMBLY FOR VERIFYING THE MOUNTING OF AN OPHTHALMIC LENS IN A FRAME

TECHNICAL FIELD OF THE INVENTION

The invention relates to the general field of optometry and to the more specific field of lens fitting in a frame.

More precisely, the present invention relates to a method for verifying the mounting of an ophthalmic lens in a frame of a pair of spectacles.

The invention further provides a method for mounting an ophthalmic lens in a frame of a pair of spectacles.

The invention is finally about an assembly for verifying the mounting of at least one ophthalmic lens in a frame of a pair of spectacles.

BACKGROUND INFORMATION AND PRIOR ART

The mounting of ophthalmic lenses, in particular complex lenses such as progressive lenses or lenses with non-zero cylindrical power, in a frame of a pair of spectacles is a crucial step of the dispensing process to the subject intended to wear said pair of spectacles.

In order to obtain an improvement in the visual performance and/or in the visual comfort, mounting parameters such as, for example centering data, orientation data (if cylindrical power), near-vision (NV) vs. far-vision (FV) points, inset VP, must be controlled in a very careful way. Usually such mounting parameters depend on the subject so that it is necessary to verify the mounting of the ophthalmic lens in situ, that is with the subject wearing the frame and the pair of spectacles. In practice, the eye-care practitioner verifies that some fitting marks present on the lenses are well positioned in front of the pupils of the subject, in a posture which is most often not very well defined.

Hence, it is usually very complicated to implement a method for verifying the mounting before the dispensing of the spectacles to the subject.

SUMMARY OF THE INVENTION

Therefore one object of the disclosure is to provide a new method which is easy to implement and cheap, and which does not require to verify the mounting on the subject.

The above object is achieved by providing a method for verifying the mounting of at least one ophthalmic lens in a frame of a pair of spectacles designed to be worn by a subject, said method comprising the steps of:
  obtaining a test image of said frame in which the at least one ophthalmic lens is mounted, said at least one ophthalmic lens comprising at least one marking visible in said test image;
  comparing a position of said at least one marking in said test image of the frame with a position of at least one reference point of an eye of the subject in a reference image of the frame worn by the subject without the at least one ophthalmic lens; and
  verifying the mounting of said at least one ophthalmic lens in said frame based on the previous comparison.

By using a reference image of the frame worn by the subject without the at least one ophthalmic lens, it is possible to test virtually, that is with an image comparison of this reference image with the test image of the frame fitted with the ophthalmic lens, the mounting of this ophthalmic lens before the dispensing of the spectacles to the subject.

Advantageously, said reference image of the frame worn by the subject without the at least one ophthalmic lens is captured in a prior calibration step, wherein the subject is in a reference head posture adapted to measure the fitting height of the ophthalmic lens, that is the vertical distance between a center of the pupil of the subject and a bottom edge of the frame.

In an embodiment of the method according to the invention, the step of comparing comprises comparing a position of said at least one marking in said test image of the frame with a position of at least one reference point of an eye of the subject in said reference image of the frame worn by the subject without the at least one ophthalmic lens.

In an embodiment of the method according to the invention, obtaining said test image is achieved by capturing said test image.

In an embodiment of the method according to the invention, the step of comparison comprises the following sub-steps:
  processing said test image and said reference image so as to obtain a processed image in which both images of the frame are superimposed;
  determining, from said processed image, a value of the distance between said marking and said reference point of the eye of the subject to be visually corrected with said at least one ophthalmic lens;
  comparing said determined value with a threshold value, the verification of the mounting being based on said comparison.

Said reference point may be a center of a pupil of the eye of the subject.

Other advantageous and non-limiting features of the method according to the invention comprise:
  said sub-step of processing the test image and the reference image comprises transforming said test image by rescaling the test image so that the frame in the test image has substantially the same size as the frame in the reference frame, and/or reshaping the test image so as to compensate at least one tilt angle of the frame in the test image, in at least one direction; and superimposing the transformed test image with the reference image;
  said threshold value is predetermined as a function of an inter-pupillary distance; and/or a value of the optical power of the ophthalmic lens;
  the threshold value is inferior or equal to 1 millimeter;
  said reference image is an image of the frame captured when the subject is in a predetermined reference head posture and wears, physically or virtually, said frame without the at least one ophthalmic lens, said reference head posture being advantageously used to measure the fitting height of the lens;
  said reference image is captured by image-capturing means having a capturing axis which is substantially horizontal and parallel to the gaze axis of the wearer;
  said reference head posture is determined on the basis of a criterion relative to at least one eyelid of the subject;
  the reference head posture is determined as a function of a movement or a position of said at least one eyelid of the subject when he/she moves his/her head up and down while keeping his/her gaze directed towards a predetermined initial direction;
  said predetermined initial direction corresponds to the direction of the gaze of the subject when he/she aims at a fixed point far away and straight ahead;

said predetermined initial direction corresponds to the direction of the gaze of the subject when he/she looks at himself/herself in a mirror or on a display;

said reference head posture is determined on the basis of a sensor;

the method further comprises the steps of memorizing the processed image; and displaying said processed image to the subject when he/she receives and wears the frame fitted with the at least one ophthalmic lens.

A further object of the disclosure is to provide a method for mounting at least one ophthalmic lens in a frame of a pair of spectacles designed to be worn by a subject, said method comprising:

mounting in said frame said at least one ophthalmic lens comprising at least one marking based on said at least one marking and on a reference image of the frame worn by the subject without the at least one ophthalmic lens;

verifying the mounting using the method for verifying described above;

finalizing the mounting based on the previous verification.

The disclosure concerns also a computer program product comprising instructions which, when the program is executed by a computer, cause the computer to carry out the method for verifying described above.

The disclosure concerns also a non-transitory computer-readable storage medium comprising instructions which, when executed by a computer, cause the computer to carry out the method for verifying described above.

Finally, the disclosure concerns an assembly for verifying the mounting of at least one ophthalmic lens in a frame of a pair of spectacles designed to be worn by a subject, the assembly comprising:

an input port for receiving a test image of the frame in which the at least one ophthalmic lens is mounted, said at least one ophthalmic lens comprising at least one marking visible in said test image;

a memory unit adapted to receive and store a reference image of the frame worn by the subject without the at least one ophthalmic lens; and a processing unit adapted to compare said test image with said reference image, for verifying the mounting of said at least one ophthalmic lens in the frame based on the previous comparison.

In an embodiment, said processing unit is adapted to compare a position of said at least one marking in the test image with a position of at least one reference point of an eye of the subject in the reference image, for verifying the mounting of said at least one ophthalmic lens in the frame based on the previous comparison.

In an embodiment, the assembly comprises an image capture apparatus configured to capture said test image.

In an embodiment, the processing unit is adapted to verify the mounting of said at least one ophthalmic lens in the frame based on the said comparison.

Advantageously, the processing unit is further adapted to:
process said test image and said reference image so as to obtain a processed image in which both images of the frame are superimposed;
determine, from said processed image, a value of the distance between said marking and the reference point of the eye of the subject to be visually corrected with said at least one ophthalmic lens; and
compare said determined value with a threshold value, the verification of the mounting being based on said comparison.

Said reference point could, in particular, be a center of a pupil of said eye.

In a preferred embodiment of the assembly, the processing unit is further adapted to:

transform said test image by rescaling the test image so that the frame in the test image has substantially the same size as the frame in the reference frame; and/or reshape the test image so as to compensate at least one tilt angle of the frame in the test image, in at least one direction; and superimposing the transformed test image with the reference image.

Preferably, the processing unit comprises:

an image processing device adapted to process said test image and said reference image so as to obtain the processed image in which both images of the frame are superimposed; and determine, from said processed image, said value of the distance between said marking and the center of the pupil of the eye of the subject; and a calculator designed to calculate a difference value between said determined value and a predetermined threshold value; and validate the mounting based on said difference value.

DETAILED DESCRIPTION OF EXAMPLE(S)

The following description, enriched with joint drawings that should be taken as non limitative examples, will help understand the invention and figure out how it can be realized.

FRAME AND OPHTHALMIC LENSES

Figures 1, 2:
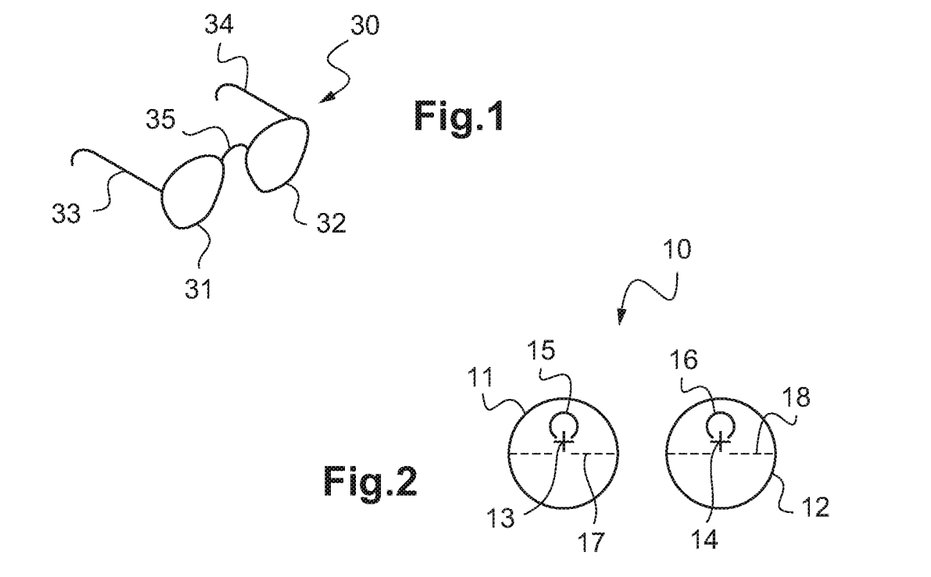
FIG. 1 is a view of a frame of a pair of spectacles for the visual correction of a subject.
FIG. 2 is a front view of two ophthalmic lenses before mounting in the frame of FIG. 1.

We represent on FIG. 1 a frame 30 in which an operator (for example an eye-care practitioner; not represented) wants to mount a pair 10 of two semi-finished ophthalmic lenses 11, 12 (see FIG. 2).

The frame 30 comprises two branches 33, 34 and two circles 31, 32 (right circle 31 and left circle 32) joined together through a nasal bridge 35. The right circle 31, respectively the left circle 32, will receive the right lens 11, respectively the left lens 12 (after cutting and edging the lenses along the dashed lines, see FIG. 3).

When the ophthalmic lenses 11, 12 are fitted in the circles 31, 32 of the frame 30, we obtain a pair of spectacles intended to be worn by a subject 1 for his/her visual correction (myopia, presbyopia, hyperopia, etc. . . . ).

The two ophthalmic lenses 11, 12 are here complex lenses such as progressive addition lenses (PAL). They both comprise a set of markings 13, 14, 15, 16, 17, 18 in order to facilitate their mounting in the two circles 31, 32 of the frame 30. For the following, we will consider only the two fitting crosses 13, 14 which are engraved on the front or back main face of the lenses 11, 12 and which allow centering the ophthalmic lenses 11, 12 in relation to the two respective circles 31, 32 of the frame.

Assembly for Verifying the Mounting

Figure 3:
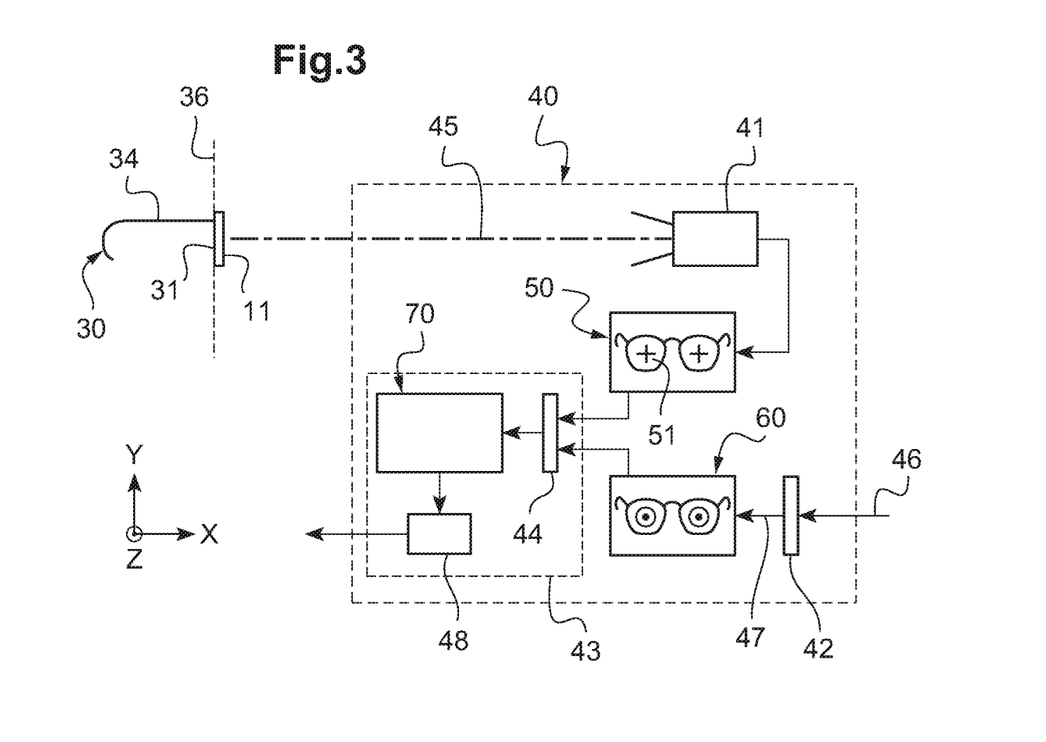
FIG. 3 is a schematic drawing of an assembly for verifying the mounting of the two ophthalmic lenses of FIG. 2 in the frame of FIG. 1.

We represent on FIG. 3 an assembly 40 according to the invention configured to verify the mounting of the two ophthalmic lenses 11, 12 into the frame 30.

This assembly 40 comprises basically:
- an image capture apparatus 41 to acquire a first picture 50 of the frame 30 (see FIG. 4);
- a memory unit 42 to store and provide (see arrow 47) a second picture 60 of the frame 30 (see FIG. 5) put on the head 2 of the subject 1 (see FIG. 7);
- a processing unit 43 to compare the first picture 50 with the second picture 60 and validate (or not) the mounting of the ophthalmic lenses 11, 12 in the frame 30 based on this comparison.

Image Capture Apparatus

The image capture apparatus 41 comprises, for example, a digital camera 41 which is configured to capture a test image 50 of the frame 30 (see FIG. 4) in which the two ophthalmic lenses 11, 12 are mounted. The camera 41 has an optical axis 45 which is directed towards the pair of spectacles 30. Preferably, the optical axis 45 of the camera 41 is substantially perpendicular to the average plane of the frame 30, which is here the plane YZ (see FIG. 3).

Figure 4:
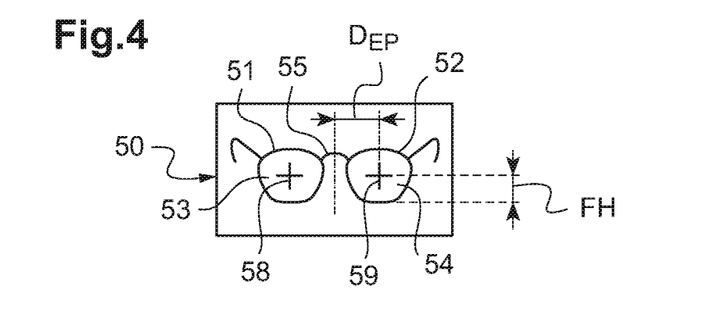
FIG. 4 represents a test image of the frame (with lenses) captured by the assembly of FIG. 3.

As shown on FIG. 4, the test image 50 of the frame 30 is formed by:
- the images 51, 52, 55 of the two circles 31, 32 of the frame 30 and of the nasal bridge 35, respectively; and
- the images 53, 54 of the two ophthalmic lenses 11, 12 comprising images 56, 57 of the both fitting crosses 13, 14 which are visible in the test image 50 of the frame 30.

Usually, for the mounting of the ophthalmic lenses 11, 12 into the circles 31, 32 of the frame 30, the operator makes use of the fitting crosses 13, 14 to adapt:
- the fitting height FH: distance between the center of the fitting cross and the bottom edge of the circle; and
- the half-pupillary distance $D_{EF}$: distance between the center of the fitting cross and the middle of the nasal bridge of the frame.

Memory Unit

The memory unit 42 receives (arrow 46 of FIG. 1) and stores a reference image 60 of the frame 30 (see FIG. 5) in a situation where the subject 1 wears the frame 30 on his head 2 (see FIG. 7), the frame 30 being not equipped with the two ophthalmic lenses 11, 12 (bare circles 31, 32, see FIG. 1).

Figure 5:
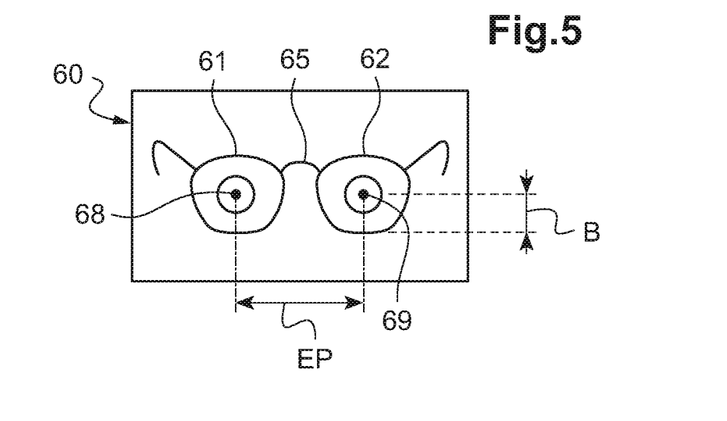
FIG. 5 represents a reference image of the frame (without lenses) worn on the head of the subject.
Figures 7, 8:
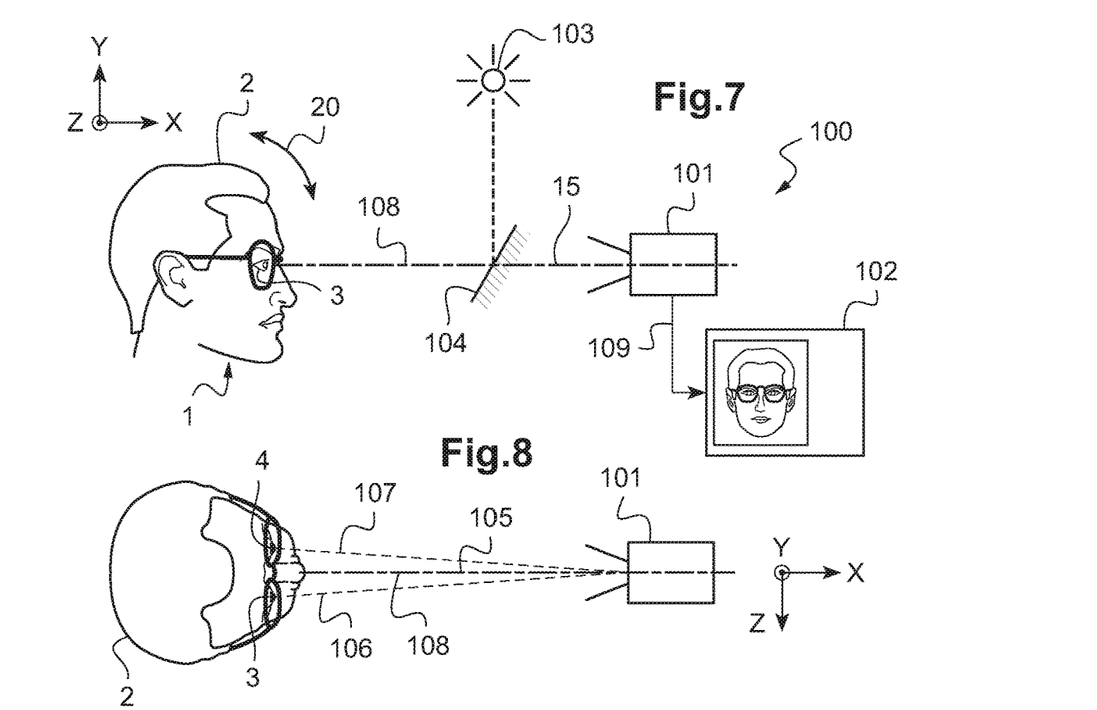
FIG. 7 is a schematic representation of a subject in front of an apparatus according to a first embodiment of the invention.
FIG. 8 is a top view of FIG. 7 showing both eyes of the subject.

As can be seen on FIG. 5, the reference image 60 is formed by:
- the images 61, 62, 65 of the two circles 31, 32 of the frame 30 and of the nasal bridge 35, respectively; and
- the images 68, 69 of the two pupils 8, 8A of the subject 1 (see FIG. 7).

We will describe father in the following text how the reference image 60 of the frame 30 can be captured in presence of the subject 1.

Processing Unit

The test image 50 and the reference image 60 are then transmitted to the processing unit 43, for example a computer or a microcontroller, which compares both images 50, 60 with each other, and which outputs a "verifier", i.e. an indicator (for example a numeric or Boolean value) showing whether the two ophthalmic lenses 11, 12 are correctly (or not) mounted in the frame 30, that is whether the markings 13, 14, 15, 16, 17, 18 are well centered (or shifted) in relation to the pupils of the eyes of the subject 1.

The processing unit 43 is programmed more specifically to compare a position of at least one of these markings 13, 14 in said test image 50 of the frame 30, with a position of at least one reference point of one of the eyes 3, 4 of the subject 1 in the reference image 60.

The reference point of said eye 3, 4 may be the point, on the outer surface of this eye, through which an average optical axis of the eye passes.

The reference point of said eye 3, 4 of the subject may be determined as being one of the following:
- a center 78, 79 of the pupil 8, 8A of the eye 3, 4 of the subject 1 (see FIG. 8 for left eye 4);
- a center of the iris of the eye 3, 4 of the subject;
- a center of a reflection of a light on the cornea of the eye 3, 4 of the subject;
- a center of the part of the eye that is unobstructed, that is to say unmasked, by the eyelids.

The location of the center of the part of the eye that is unobstructed by the eyelid may be determined as being: in the horizontal direction, at the middle between the left and right ends of said part of the eye, and, in the vertical direction, as being at the middle between the upper and lower ends of said part of the eye.

In the preferred embodiment represented on FIG. 3, the processing unit 43 comprises:
- an image processing device 44 configured to process the test image 50 and/or the reference image 60 of the frame 30; and
- a calculator 48 designed to analyze these processed images, make calculations based on them, and output said indicator.

Image Processing Device

The image processing device 44, which is for example a DSP chip comprising at least one processor for comparing the test image 50 and the reference image 60, obtains:
- the test image 50 of the frame 30 (see FIG. 4) acquired and transmitted by the image capture apparatus 41 to the processing unit 43 (see above); and
- the reference image 60 of the frame 30 (see FIG. 5) stored in and transmitted by the memory unit 42 to the processing unit 43.

The test image 50 and the reference image 60 are received, or, in other words, acquired, by the image processing device 44 by means of at least one input port.

In an alternative embodiment, the assembly may be realized without said image capture apparatus, thus receiving the test image from a distinct, external device, by means of said input port.

Figure 6:
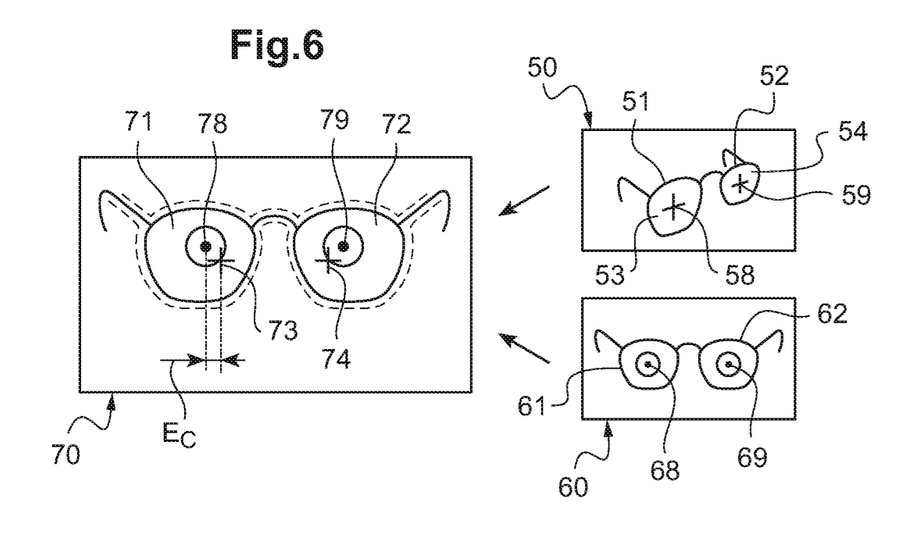
FIG. 6 represents a processed image obtained by superimposition of the test image of FIG. 4 with the reference image of FIG. 5.

Advantageously, the image processing device 44 processes the test image 50 and/or the reference image 60, and outputs a processed image 70 where both images 50, 60 of the frame 30 are superimposed (see FIG. 6).

From the processed image 70, the image processing device 44 determines, from the positions of images 73, 74 of the fitting crosses 13, 14 and from the positions of the images of noticeable features of the eyes, like images 78, 79 of the pupils 8, 8A, a value of the distance $E_c$ between the fitting crosses 13, 14 and the above mentioned references points, each associated with one of the subject's eyes 3, 4.

In the embodiment represented on FIG. 6, said reference points are the centers of the pupils 8, 8A of the subject 1. The distance $E_c$ is determined, in this case, from the positions of the images 78, 79 of the pupils 8, 8A and from the positions of the images 73, 74 of the fitting crosses 13, 14 in the processed image 70.

The distance Ec is the real distance that would be measured in situ with the subject 1 wearing the pair of spectacles, wherein the frame 30 is fitted with the two ophthalmic lenses 11, 12 still displaying their fitting crosses 13, 14.

In the preferred embodiment of FIG. 3, the image processing unit 44 is programmed to:
  transform (see FIG. 6) the test image 50, preferably by:
    rescaling the test image 50 so that the image of the frame 30 in the test image 50 has substantially the same size as the image of the frame 30 in the reference image 60; and/or
    reshaping the test image 50 so as to compensate at least one tilt angle of the frame 30 in the test image 50, in at least one direction; and
  superimpose the so transformed test image 50 with the reference image 60 to build the processed image 70.
Calculator The calculator 48, which is for example a CPU (stands for "Central Processing Unit"), then treats the processed image 70 and calculates a difference value ΔE between the determined value $E_c$ of the distance (between the fitting crosses 13, 14 and the pupils 8, 8A of the subject 1) and a predetermined threshold value $E_{c,th}$: $\Delta E = E_c - E_{c,th}$.

Based on that difference value ΔE, the calculator 48 confirms that:
  if the difference value ΔE is greater than zero: the mounting of the lenses 11, 12 in the frame 30 is correct (i.e. verification OK); and
  if the difference value ΔE is lower than zero: the mounting of the lenses 11, 12 in the frame 30 is incorrect (i.e. verification not OK).

Preferably, the threshold value is predetermined as a function of an inter-pupillary distance between the two pupils of the eyes of the subject, and/or a value of the optical powers of the ophthalmic lenses 11, 12.

In practice, one chooses the threshold value to be inferior or equal to 1 millimeter, preferably inferior to 0.5 mm.

Reference Head Posture

We will describe hereafter how (i.e. in which conditions) the reference image 60 of the frame 30 can be determined.

In the preferred embodiment represented on FIGS. 7-13, the reference image 60 is the image of the frame 30 captured when the subject 1 is in a predetermined reference head posture (see FIGS. 7 and 10), while he (we will assume for the rest of the description that the subject is a man) is wearing, physically or virtually, the frame 30 without the lenses 11, 12.

The reference head posture, which is specific for each subject, is quite stable and does not vary very much from one day to the other. Hence, determining the reference head posture of the subject 1 is particularly useful when carrying out optical and/or eye- or head-related measurements of the subject 1, for example when trying to verify the mounting of the lenses 11, 12 in the chosen frame 30.

The reference head posture (see FIGS. 7 and 10) is determined in accordance with the position and/or the movement of one or both eyelids (upper or lower) of the subject, while he (we will assume for the rest of the description that the subject is a man) moves his head.

In practice, in the reference head posture, the traditional "fitting height" (length B on FIG. 5) can be determined either directly or through a transfer law.

We represented on FIG. 7 an example apparatus 100 which allows determining said reference head posture.

This apparatus 100 comprises a digital video recorder 101 (hereinafter referred to as a camera) and a computer system 102, linked to the camera 101 by a digital cable 109 for 2-ways communication.

The apparatus 100 preferably comprises eye-catching means 103, 104 arranged in front of the subject 1 so that he adopts an initial head posture wherein he directs his gaze 16, 17 towards a predetermined direction 18 (see FIG. 8).

The eye-catching means 103, 104 comprise here a light source 103, for example a light-emitting diode (LED), and a semi-transparent or dichroic mirror 104 positioned and oriented in front of the subject 1 with respect to the light source 103 and the head 2 of the subject 1 so that the predetermined direction 108 is substantially horizontal, along the horizontal axis X (see arrows in FIGS. 7 and 8).

In other words, the LED 103 is placed just above/upright the mirror 104 which is tilted with a 45° angle relative to the vertical axis Y so that the (virtual) image of the light source 103 is positioned on the horizontal axis X (behind the mirror 104, near the camera 101), along the predetermined direction 108.

In a variant, the light source may be positioned at the same height as the eyes of the subject, so that the initial head posture is the one that the subject would adopt when looking at a far-distant point (far vision).

In another variants, the predetermined direction may be defined by the subject's gaze direction when he is looking at a fixed point straight ahead (a light source placed close to the camera) or at himself in a mirror or on a display screen, for example on the screen of his cell phone of his digital tablet.

The camera 101 is preferably positioned in front of the head 2 of the subject 1, behind the semi-transparent or dichroic mirror 104, and has an optical axis 105 which is preferably parallel to the visual axis 108 (see FIG. 8) of the subject 1 (to avoid parallax issue when capturing the images of both eyes of the subject).

The camera 101 is optically and mechanically set up to capture images of the head 2 and the eyes 3, 4 of the subject 1 placed in front of the camera 101.

The computer system 102 may also comprise a video screen 102 to monitor in real time the images or films recorded by the camera 101. The computer system 102 comprises calculation means suitable to analyze the images captured by the camera 101 and run image-processing algorithms to extract useful information from those images and determine the looked—for reference head posture as a function of a movement or a position of at least one eyelid of the subject.

Using the apparatus 100 of FIG. 7, it is possible to perform a method for determining the reference head posture of the subject 1. This method comprises the steps of:
  a) asking the subject 1 to:
    a1) adopt an initial head posture wherein he directs his gaze towards the predetermined direction 108;

a2) move his head up and down (see double arrow 200 on FIG. 7) starting from the initial head posture while keeping his gaze directed towards the predetermined direction 108; and b) determining the reference head posture as a function of a movement or a position of at least one eyelid of the subject 1 during the motion of his head at step a2).

Figure 9:
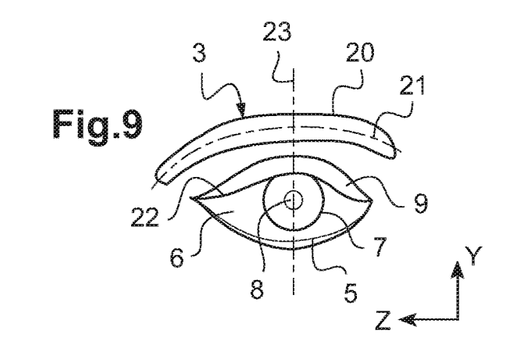
FIG. 9 is a schematic drawing of the eye of a subject showing his eyelids and the pupil of his eye in an initial head posture.
Figure 10:
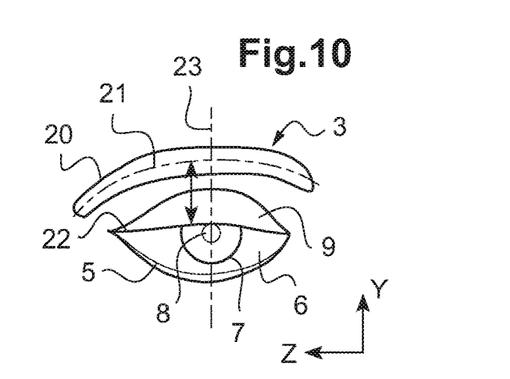
FIG. 10 is a schematic drawing of the eye of FIG. 10 in the reference head posture.

We have represented on FIGS. 9 and 10, the head 2 of the subject 1 when he is respectively in the initial head posture (case of FIG. 9) and in the reference head posture (case of FIG. 10).

Step a)

At the beginning of the method for determining the reference head posture, the subject 1 sits, or stands, in front of the apparatus 100 and tries to focus on the image of the light source 103 reflected by the mirror 104. In this situation, his gaze (i.e. the lines of sight 106, 107 in FIG. 8) is directed towards the image, defining the predetermined direction 108.

The predetermined initial direction corresponds to the direction of the gaze of the subject when he aims at a fixed point far away and straight ahead.

Alternatively, the predetermined initial direction may correspond to the direction of the gaze of the subject when he looks at himself in a mirror or on a display.

Figure 11:
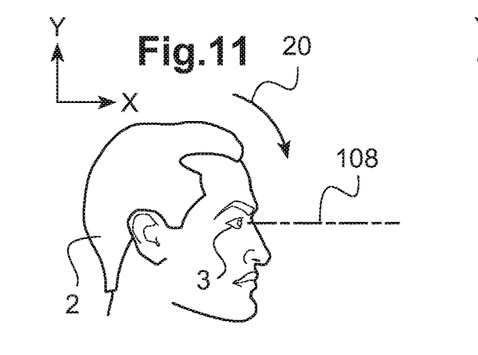
FIGS. 11 and 12 are schematic drawings of the head of the subject in the initial head posture and in the reference head posture respectively.

In the initial head posture (FIG. 9), we represented on FIG. 11 a detailed view of the (right) eye 3 of the subject 1 with:

the lower eyelid 5 and the upper eyelid 9;
the sclera 6;
the iris 7 and the pupil 8.

Preferably, the lighting conditions of the experiment is such that the subject 1 is in photopic conditions (high environment luminance level above roughly 300 cd/m$^2$) so that the pupil 8 of the eye 3 of the subject 1 is close to its minimum size (myosis), which is generally around 1.5 to 2 millimeters.

In practice here, the photopic conditions are obtained with ambient lighting (for example such as those usually found at an optical shop) and with the light level of the light source 13.

As shown on FIG. 11, the upper eyelid 9 of the right eye 3 is at this time lifted up, such that it only hides a small upper part of the iris 7, yet without vignetting the pupil 8.

In the initial head posture (FIGS. 9 and 11), one may acquire an image of the entire eye 3 of the subject 1, comprising the eyebrow 20 of the subject and the arch 21 of the eyebrow 20. Preferably, one can process the acquired image to identify the arch 21 and an edge 22 of the upper eyelid 9, and calculate an initial position of the upper eyelid 9 of the eye 3, defined by the distance, along the vertical axis 23 (parallel to axis X), from the arch 21 to the edge 22 of the upper eyelid 9.

Then, starting from the initial head posture (FIG. 9) where the subject 1 directs his gaze 16 in the predetermined direction 108, the subject 1 is asked to move his head 2 up and down (step a2; see double arrow 200 on FIG. 9) without stopping looking towards the image of the light source 103 and preferably without turning his head 2 to the left or to the right.

Step b)

During the whole motion of his head 2, the camera 101 of the apparatus 100 records, for example at a sampling rate of 30 or 60 Hz, the images of the eyes 3, 4 of the subject 1 and send the images to the computer system 102 for image processing and analysis.

The reference head posture (see FIG. 10) is then determined as a function of the movement or the position of the upper eyelid 9 of the subject 1 during the motion of his head 2.

Alternatively, the lower eyelid (reference 5 in FIG. 11) may be used in the images of the eye of the subject.

Figure 12:
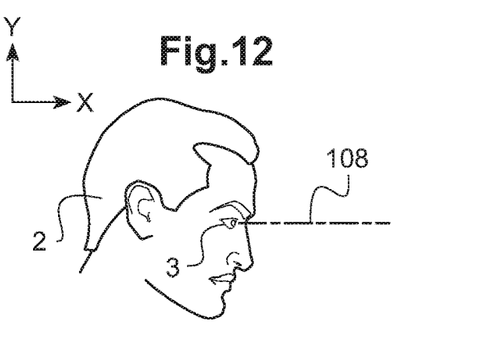

As shown in FIG. 12, in the reference head posture, the upper eyelid 9 is here lowered with respect to its initial position (initial head posture of FIG. 9) such that it hides almost one half of the iris 7 (see above).

In the reference head posture (FIG. 10), one may also calculate a "reference" position of the upper eyelid 9 of the eye 3, defined again by the distance, along the vertical axis 23 (parallel to axis Y), from the arch 21 to the edge 22 of the upper eyelid 9 (see FIG. 12).

Preferably, the reference head posture is determined at step b) as the posture adopted by the subject 1 at an instant where the upper eyelid 9 fits in, or respectively gets out of, the arch 21 of the corresponding eyebrow 20 of the subject 1, when the head 2 of the subject 1 is moving down, respectively is moving up.

When the reference head posture is located thanks to the movement of the upper eyelid 9, it is determined at step b) as the head posture adopted by the subject 1 at an instant where the upper eyelid 9 stops, respectively starts, moving when the head 2 of the subject 1 is moving up, respectively is moving down.

The reference head posture may be determined either with the video camera 101 (cases of FIGS. 10 and 12) or directly by a visual observation. In case of visual observation, one may equip the subject with a special device recording the inclination angle of the head of the subject. The eye-care practitioner (ECP) who carries the method then notes the inclination angle corresponding to the reference head posture of the subject.

Then, in order to reproduce the reference head posture, determined previously with the method, it is possible to fit the head 2 of the subject 1 (if he doesn't wear a frame) or the frame he wears with the above inclination device; and ask the subject 1 to tilt his head 2 until the inclination angle equalize the value determined during the previous measurement.

The apparatus 100 and method for determining the reference head posture may be implemented when the subject is wearing, or not, eyeglasses with a frame, with or without an ophthalmic lens fitted in the frame. Those eyeglasses may be the one he usually wears or a new one he chose.

The above apparatus 100 and method are particularly interesting in order to take various measurements on the subject 1 when he is in the reference head posture, as the reference head posture is kind of specific of the subject 1 in determined conditions.

Method for Verifying the Mounting

We will now detail the method for verifying the mounting of the ophthalmic lenses 11, 12 in the frame 30 of a pair of spectacles according to the invention.

In practice, before verifying the mounting, the subject 1 has already chosen a frame 30, for example in an optical store or on the Internet.

After some adjustments of the frame 30 on the head 2 of the subject 1, one determines the reference head posture (see FIGS. 7 and 10) and acquires the corresponding reference image 60 (see FIG. 5) of the frame 30 worn by the subject 1 without the lenses 11, 12.

Besides, one can also take the measurement of the inter-pupillary distance and of the distinctive height B of the pupils 8, 8A in relation to the bottom edge of the respective circles 31, 32 of the frame 30 (see FIG. 5).

The reference image 60 is then sent to the memory unit 42 of the assembly 40 for storage.

Advantageously, a copy of the reference image 60 is also sent to the operator responsible for the mounting of the lenses 11, 12 into the frame 30.

Then, the operator mounts in the frame 30 the two ophthalmic lenses 11, 12 based on the markings 13, 14, 15, 16, 17, 18 and also on the reference image 60 of the frame 30 (actually on the copy of the reference image 60 he received) worn by the subject without the lenses (see above).

In particular, the operator uses the inter-pupillary distance $D_{EP}$ and the fitting height B (see FIG. 5) whose values can be either measured by the optician with a ruler in the reference head posture or calculated from the reference image if one knows the scale of the reference image.

At this stage, the method for verifying the mounting may be performed, for example by the operator who mounted the lenses 11, 12 in the frame 30.

According to the invention, the method for verifying the mounting comprises the steps of:
  capturing the test image 50 of the frame 30 in which the two lenses 11, 12 are mounted (see FIG. 4), both the ophthalmic lenses 11, 12 comprising the markings 13, 14, 15, 16, 17 visible in the test image 50;
  comparing the test image 50 of the frame 30 with the reference image 60 of the frame 30 without the ophthalmic lenses 11, 12 previously captured with the apparatus 100 (see FIG. 7); and
  verifying the mounting of the two ophthalmic lenses in the frame 30 based on this comparison.

Alternatively, the test image 50 may be captured in a preliminary stage, prior to the execution of the method.

The test image 50 can thus be obtained either by capturing it, or by receiving it, for instance by means of an input port (the test image being captured prior to the execution of the method, in this last case).

Regarding the comparison step, it is carried on by at least one processor, for instance by one processor of the above-mentioned assembly 40.

The comparison step comprises, for instance, a step of comparing a position of at least one of said markings 13, 14, in said test image 50 of the frame 30, with a position of at least one reference point of one of the eyes 3, 4 of the subject 1, in the reference image 60.

As already mentioned, the reference point of one of the eyes 3, 4 of the subject may be the point, on the outer surface of this eye, through which an average optical axis of the eye passes.

The reference point of the eye 3, 4 of the subject may be determined as explained above, in the section relative to the processing unit 43. This reference point may, in particular, be the center 78, 79 of the pupil 8, 8A of the eye 3, 4 of the subject 1. Preferably, the comparison step comprises further the following sub-steps:
  processing, by means of the image processing device 44 of the processing unit 43 of the assembly 10, the test image 50 and the reference image 60 so as to obtain the processed image 70 in which both images 50, 60 of the frame 30 are superimposed;
  determining, from the processed image 70, the value $E_c$ of the distance between the fitting crosses 13, 14 and said reference point of the eye 3, 4 of the subject 1 (see FIG. 8 for left eye 4); and
  comparing the determined value $E_c$ with the threshold value $E_{c,th}$.

Preferably, said reference point is the center 78, 79 of the pupil 8, 8A of the eye 3, 4 of the subject 1.

Finally, at the end of the method according to the invention, the verification of the mounting is realized based on this comparison of the determined value $E_c$ with the threshold value $E_{c,th}$ (see description of the processing unit 43 above).

In a preferred embodiment of the method, the sub-step of processing the test image 50 and the reference image 60 comprises (see also description of the assembly above):
  transforming the test image 50 by rescaling the test image 50 so that the image of the frame 30 in the test image 50 has substantially the same size as the image of the frame 30 in the reference image 60; and/or reshaping the test image 50 so as to compensate at least one tilt angle of the frame 30 in the test image 50, in at least one direction (for example direction Y); and
  superimposing the transformed test image with the reference image 60.

The rescaling of the test image 50 is done through a simple comparison of the images of the frames taken without the lens in the shop and with the lens in the lab. The target is to obtain a perfect superimposition of the two frames in those images. It may be obtained by a simple linear horizontal and/or vertical rescaling followed by a 2D best-fit process in an iterative way. It may also be achieved through an optimization process that simultaneously optimizes the size and the position of the two frames in the two images.

At the end, the operator can finalize the mounting based on the previous verification.

The invention claimed is:

1. A method for verifying mounting of at least one ophthalmic lens in a frame of a pair of spectacles configured to be worn by a subject, said method comprising:
  obtaining a test image of the frame in which the at least one ophthalmic lens is mounted, said at least one ophthalmic lens comprising at least one marking visible in said test image;
  comparing said test image of the frame with a reference image of the frame worn by the subject without the at least one ophthalmic lens; and
  verifying the mounting of said at least one ophthalmic lens in said frame based on the comparing the test image with the reference image.

2. The method according to claim 1, wherein the comparing comprises comparing a position of said at least one marking in said test image of the frame with a position of at least one reference point of an eye of the subject in said reference image of the frame worn by the subject without the at least one ophthalmic lens.

3. The method according to claim 2, wherein the comparing comprises:
  processing said test image and said reference image to obtain a processed image in which both of the test image and the reference image of the frame are superimposed,
  determining, from said processed image, a value of the distance between said marking and said reference point of the eye of the subject to be visually corrected with said at least one ophthalmic lens, and
  comparing said determined value with a threshold value.

4. The method according to claim 3, wherein said processing the test image and the reference image comprises:
  transforming said test image by:
    one or more of: (i) rescaling the test image so that the frame in the test image has substantially the same size as the frame in the reference image and (ii)

reshaping the test image to compensate at least one tilt angle of the frame in the test image, in at least one direction, and superimposing the transformed test image with the reference image.

5. The method according to claim 4, wherein the threshold value is predetermined as a function of:
an inter-pupillary distance (DEP), and
a value of the optical power of the ophthalmic lens.

6. The method according to claim 3, wherein the threshold value is predetermined as a function of:
an inter-pupillary distance (DEP), and
a value of the optical power of the ophthalmic lens.

7. The method according to claim 1, wherein the comparing comprises:
processing said test image and said reference image to obtain a processed image in which both both of the test image and the reference image of the frame are superimposed,
determining, from said processed image, a value of the distance between said marking and a center of a pupil of an eye of the subject to be visually corrected with said at least one ophthalmic lens, and
comparing said determined value with a threshold value, wherein the verifying the mounting is based on said comparing the determined value with the threshold value.

8. The method according to claim 7, wherein said processing the test image and the reference image comprises:
transforming said test image by:
one or more of: (i) rescaling the test image so that the frame in the test image has substantially the same size as the frame in the reference image and (ii) reshaping the test image to compensate at least one tilt angle of the frame in the test image, in at least one direction, and
superimposing the transformed test image with the reference image.

9. The method according to claim 7, wherein the threshold value is predetermined as a function of:
an inter-pupillary distance (DEP), and
a value of the optical power of the ophthalmic lens.

10. The method according to claim 1, wherein the reference image is an image of the frame captured when the subject is in a predetermined reference head posture and wears, physically or virtually, said frame without the at least one ophthalmic lens.

11. The method according to claim 10, wherein said reference image is captured by an image capture device having a capturing axis which is substantially horizontal and parallel to the gaze axis of the wearer.

12. The method according to claim 10, wherein the reference head posture is determined based on a criterion relative to at least one eyelid of the subject.

13. The method according to claim 1, wherein said test image is obtained by capturing said test image.

14. A method for mounting at least one ophthalmic lens in a frame of a pair of spectacles configured to be worn by a subject, said method comprising:
mounting in said frame said at least one ophthalmic lens comprising at least one marking, based on said at least one marking and a reference image of the frame worn by the subject without the at least one ophthalmic lens;
verifying the mounting by
obtaining a test image of the frame in which the at least one ophthalmic lens is mounted, said at least one marking visible in said test image, and
comparing said test image of the frame with the reference image of the frame worn by the subject without the at least one ophthalmic lens,
the mounting of said at least one ophthalmic lens in said frame being based on the comparing the test image with the reference image; and
finalizing the mounting based on the verifying the mounting.

15. A non-transitory computer-readable medium on which is stored a computer program comprising instructions which, when the program is executed by a computer, cause the computer to carry out the method of claim 1.

16. An assembly for verifying mounting of at least one ophthalmic lens in a frame of a pair of spectacles configured to be worn by a subject, the assembly comprising:
an input port configured to receive a test image of the frame in which the at least one ophthalmic lens is mounted, said at least one ophthalmic lens comprising at least one marking visible in said test image;
a memory configured to receive and store a reference image of the frame worn by the subject without the at least one ophthalmic lens; and
a processor programmed to compare the test image with the reference image to verify the mounting of said at least one ophthalmic lens in the frame based on the comparing the test image with the reference image.

17. The assembly according to claim 16, wherein said processor is configured to compare a position of said at least one marking in the test image with a position of at least one reference point of an eye of the subject in the reference image, to verify the mounting of said at least one ophthalmic lens in the frame based on the comparing the test image with the reference image.

18. The assembly according to claim 16, wherein said processor comprises:
an image processor configured to:
process said test image and said reference image to obtain a processed image in which both of the test image and the reference image of the frame are superimposed, and
determine, from said processed image, a value of the distance between said marking and a center of a pupil of an eye of the subject to be visually corrected with said at least one ophthalmic lens, and
a calculator configured to:
calculate a difference value between said determined value and a predetermined threshold value, and
validate the mounting based on said difference value.

19. The assembly according to claim 16, further comprising an image capture apparatus configured to capture said test image.

20. The assembly according to claim 16, wherein said processor is configured to verify the mounting of said at least one ophthalmic lens in the frame based on the comparing the test image with the reference image.

* * * * *